(12) United States Patent
Chee et al.

(10) Patent No.: US 6,372,858 B1
(45) Date of Patent: Apr. 16, 2002

(54) SOLID NUCLEOPHILIC REAGENT FOR CONVERSION OF BENZYLIC HALOGEN FUNCTIONALITY ON POLYMERS TO OTHER FUNCTIONALITIES

(75) Inventors: Chia S. Chee, Baton Rouge, LA (US); Hsien-Chang Wang, Bellaire, TX (US); Kenneth William Powers, Berkeley Heights, NJ (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/687,685

(22) Filed: Oct. 13, 2000

Related U.S. Application Data

(62) Division of application No. 08/897,745, filed on Jul. 21, 1997, now Pat. No. 6,156,810.
(60) Provisional application No. 60/023,044, filed on Aug. 1, 1996.

(51) Int. Cl.[7] .................................................. C08F 8/00
(52) U.S. Cl. .................... 525/340; 525/333.4; 525/341; 525/342; 525/343; 525/353; 525/366; 525/379; 525/381
(58) Field of Search ................................ 525/340, 341, 525/342, 343, 353, 366, 379, 381

(56) References Cited

U.S. PATENT DOCUMENTS

| 3,708,462 A | 1/1973 | McKinley et al. |
| 4,039,485 A | 8/1977 | Argabright et al. |
| 4,280,003 A | 7/1981 | Herbin et al. |
| 4,322,501 A | 3/1982 | Lee et al. |
| 5,162,445 A | 11/1992 | Powers et al. |
| 5,203,982 A | 4/1993 | McDonald |

FOREIGN PATENT DOCUMENTS

| EP | 0 243 006 A2 | 10/1987 |
| EP | 0 705 810 A2 | 4/1996 |
| WO | WO 91 07451 | 5/1991 |
| WO | WO 92 16569 | 10/1992 |
| WO | WO 93 08220 | 4/1993 |
| WO | WO 94 22950 | 10/1994 |
| WO | WO 95 07945 | 3/1995 |
| WO | WO 96 11959 A | 4/1996 |

Primary Examiner—Bernard Lipman
(74) Attorney, Agent, or Firm—Brent M. Peebles; Kevin M. Faulkner

(57) ABSTRACT

A solid nucleophilic reagent for the conversion of benzylic halogen functionality on polymers to other functionalities, and methods of making and using the same.

6 Claims, No Drawings

SOLID NUCLEOPHILIC REAGENT FOR CONVERSION OF BENZYLIC HALOGEN FUNCTIONALITY ON POLYMERS TO OTHER FUNCTIONALITIES

This is a divisional of Ser. No. 08/897,745, filed Jul. 21, 1997, now U.S. Pat. No. 6,156,810, which claims the benefit of Provisional Application No. 60/023,044, filed Aug. 1, 1996.

BACKGROUND OF THE INVENTION

1. Field of Invention

The present invention is directed to the use of solid nucleophilic reagents for conversion of the benzylic bromine functionality on brominated isobutylene/para-methylstyrene copolymer to other functionalities and methods of making and using the same.

2. Related Art

The benzylic halogen, like bromine, functionality on copolymers is uniquely suited as the base from which versatile functionalized saturated copolymers can be made because it can be made to undergo "clean" nucleophilic substitution reactions with a great range of nucleophiles, so that many desired types and amounts of functionality can be introduced without undesirable side reactions and under conditions which are mild enough to avoid degradation and/or cross-linking of the saturated copolymer containing the pendant benzylic halogen functionality. Furthermore, in many instances, it is possible to only partially convert the pendant benzylic halogen to another desired functionality while retaining some, or to later convert another portion of the remaining benzylic halogen functionality to yet another new functionality, so that copolymers containing mixed functionalities can be made. The mixed functionality has been utilized to provide unique combinations of properties, such as grafting with another functional polymer via one of the functionalities and then crosslinking or adhering to some surface via another of the functionalities. (See, e.g., U.S. Pat. No. 5,162,445 which is herein incorporated by reference.)

A benzylic halogen functionality constitutes a very active electrophile which will react under suitable conditions with any nucleophile capable of donating electrons to it. Suitable nucleophiles include, but are not limited to, those containing oxygen, sulfur, nitrogen, sodium, and potassium. Equally important to this versatility in types of nucleophiles which will react with the benzylic halogen functionality, is the relatively mild conditions under which these nucleophilic substitution reactions proceed so that substitution reactions can be completed to introduce the desired new functionality without cleavage or cross-linking reactions involving the saturated hydrocarbon backbone. For example, by using isobutylene/para-bromo-methylstyrene/para-methylstyrene terpolymers as a "base" polymer for modification, and by conducting nucleophilic substitution reactions under appropriate conditions many pendent functionalities have been prepared: (1) esters (many containing other functional groups such as acetate, stearate, linoleate, eleostrearate, acrylate, cinnamate, etc.); (2) hydroxyl (attached directly in place of the benzylic bromine or attached via another linkage); (3) carboxy; (4) nitrile; (5) quaternary ammonium salts; (6) quaternary phosphonium salts; (7) s-isothiuronium salts; (8) dithiocarbamate esters; and (9) mercaptans.

The above-described nucleophilic reactions require achieving an intimate contact between the reactants under the proper reaction conditions. In typical ion-exchange processes, the reactants involved are generally both small molecules; thus the required intimate contact is generally easily achieved by using a suitable solvent system. However, when one or both, of the reactants are attached to a large polymeric molecule, it is much more difficult to achieve the required intimate contact. In the instant invention, the benzylic halogen (the "polar" electrophile) is attached to and thus "buried" within a low polarity hydrocarbon copolymer matrix (the isobutylene/para-methylstyrene copolymer backbone). The achieving of the required intimate contact between the polar reactants (the electrophile and the nucleophile) when the electrophile (the benzylic halogen) is attached to and "buried" within the low polarity hydrocarbon polymer matrix presents a formidable challenge. The brominated isobutylene/para-methylstyrene copolymers containing reactive benzylic bromine electrophilic functionality are most readily soluble in low polarity hydrocarbon solvents with solubility parameters close to that of the copolymer (i.e. 6 to 7). On the other hand, most small molecule nucleophiles are either insoluble or only sparingly soluble in those low polarity solvents which are preferred for the benzylic bromine containing copolymers. Hence, it is difficult to find a common solvent for both reactants so that the nucleophilic substitution reaction can proceed. Furthermore, the low polarity hydrocarbon solvents in which the brominated benzylic bromine containing copolymers are soluble do not solvate the polar reaction sites (i.e. the electrophile/nucleophile sites) well so that the substitution reactions do not proceed at satisfactory rates even if the reactants are brought into contact in that low polarity medium.

Powers et. al. in U.S. Pat. No. 5,162,445 have described conditions under which nucleophilic substitution reactions, utilizing the benzylic halogen functionality of isobutylene/para-methylstyrene copolymers can be run but the conditions require the use of solvent blends containing a polar co-solvent to dissolve the nucleophilic reagent and solvate the reaction site; require the use of expensive phase transfer catalysts which are difficult to recover and reuse; require enhancing solubility of the nucleophilic reagents (in the low polarity hydrocarbon solvents in which the brominated isobutylene/para-methylstyrene copolymers are soluble) by using large and expensive organo-soluble cations such as tetrabutylammonium; and require very extensive and expensive washing steps to remove the by-products of the nucleophilic substitution reaction before the substituted isobutylene/para-methylstyrene copolymer can be worked up and recovered for use.

In particular, the required washing steps often greatly complicate and add to the cost of the process under the previously described reaction conditions. For instance: under the previously described conditions, the benzylic bromine on a brominated isobutylene-para-methylstyrene copolymer could be replaced with acrylate by a nucloephilic substitution reaction between the copolymer and tetrabutylammonium acrylate. The process would involve bringing the electrophile and the nucleophile into the required intimate contact by dissolving the copolymer in a hydrocarbon solvent such as hexane (or a hexane/isopropanol solvent blend); dissolving the tetrabutylammonium acrylate in a polar solvent such as isopropanol; mixing the two solutions and heating to effect the substitution reaction in a resulting solvent blend of approximately 85% hydrocarbon and 15% alcohol. (Alternatively, the tetrabutylammonium acrylate nucleophilic reagent could be formed "in-situ" by reacting tetrabutylammonium hydroxide with acrylic acid but the reaction medium would still have to be an hydrocarbon/alcohol blend and use of the expensive tetrabutylammonium cation would still be necessary.) The products of the nucleophilic substitution reaction would be the desired acrylate derivative of the copolymer and tetrabutylammonium bromide by-product in the mixed hydrocarbon/alcohol solvent blend (also containing some water by-product if the tetrabutylammonium acrylate nucleophilic reagent were formed "in-situ" by reacting tetrabutylammonium hydroxide with acrylic acid). It is necessary to completely remove the tetrabutylammonium bromide by-product during the work-up and recovery of the desired polymeric acrylate derivative because even small amounts of the tetrabutylammonium bromide left in the polymeric product can cause cross-linking and/or gelation in the polymeric product as well as introducing other product quality problems. Very extensive washing steps including basic, acidic, and then neutral washes are required to completely remove the tetrabutyl ammonium bromide. These washing steps are very time consuming and costly and make it very difficult and costly to recover and recycle the expensive tetrabutylammonium cation, the polar cosolvent (isopropanol) and any phase transfer catalyst used because these materials have been extracted and are present at high dilution in the large volume of water used in the multiple washes. Furthermore, the washing steps are made very difficult to accomplish because the quaternary ammonium salts (i.e. tetrabutylammonium bromide and/or phase transfer catalysts) act as emulsifiers so that the separation of the aqueous and organic phases is slow and difficult and extensive messy "cuff" phases are often encountered. Overall, then the required washing steps in the previous nucleophilic substitution processes greatly complicate and add to the cost of producing the desired polymeric derivative.

In accordance with this invention, use of solid nucleophilic reagents for conversion of benzylic halogen functionality on polymers to other functionalities via a nucleophilic substitution process greatly simplify and reduce the cost of producing those desirable functional derivative polymers. The present invention provides a method for completely eliminating the expensive and extensive washing steps of the previous methods with all their inherent complications and problems and makes it possible to easily recycle the solvent blend (with no separation necessary) and to repeatedly regenerate and reuse the nucleophilic reagent, for example quaternary ammonium cation, thus greatly minimizing waste and operating cost. Furthermore, a very high quality functional polymer is readily produced by the present invention since the nucleophilic substitution reaction by-products are "formed on" and "attached to" the surface of the novel solid nucleophilic reagent and thus easily separated from the functionalized copolymer solution so that the desired copolymer can be directly recovered.

In the present invention, the nucleophilic reagent is formed on and attached to a suitable solid, e.g. an ion exchange resin. The nucleophilic substitution reaction is caused to occur on the surface or within the pores of the solid nucleophilic reagent by simply contacting a solution of the benzylic halogen containing copolymer in a suitable solvent under suitable conditions. The resulting functionalized polymer is retained in solution whereas the reaction by-product is attached to the solid and thus easily separated from the polymeric solution. The functionalized polymeric product is easily recovered in pure form with no require washing steps by simply separating it from the solvent, e.g. in a devolatilizing extruder. The solvent (or solvent blend) is simply recycled with no required separation or purification. The solid nucleophilic reagent is easily regenerated and used again with no loss or difficult waste disposal problem.

For example, the benzylic bromine on a brominated isobutylene/paramethylstyrene co-polymer can be easily replaced by acrylate via a nucleophilic substitution reaction as follows: a functionalized polystyrenic anion exchange resin containing benzyl tributyl ammonium bromide surface groups is packed into a column to form a resin bed and treated with dilute aqueous caustic and then dilute aqueous acrylic acid (both at 1.5 mmoles per MEQ) to yield the desire solid nucleophilic reagent bed containing surface benzyl tributyl ammonium acrylate functionality. The nucleophilic substitution reaction is effected by slowly pumping a 15% solution of the brominated isobutylene/para-methylstyrene in a 90/10 pentane/isopropanol solvent blend through the packed column at 70° C. at a rate sufficient to convert the benzylic halogen to the new desired functional group. The nucleophilic substitution reaction occurs in the polymer solution at the surface of the solid nucleophilic reagent with the polymeric benzyl bromide groups being converted to benzyl acrylate groups to give the desire acrylate functionalized polymer and the benzyl tributyl ammonium acrylate groups on the resin being converted to benzyl tributyl ammonium bromide groups. The desired functionalized polymer is directly recovered from the solution exiting the resin packed column by passing the solution through a devolatilizing extruder to remove the solvent and recover the desired acrylate functionalized polymer for packaging and sale. The recovered solvent blend is directly recycled and used to dissolve more of the brominated isobutylene/para-methylstyrene copolymer for conversion. When sufficient polymer has been pumped through the resin packed column to convert most of the benzyl tributyl ammonium acrylate surface functionality back to benzyl tributyl ammonium bromide functionality, the nucleophilic substitution reaction slows down and eventually ceases so the resin must be regenerated. This is easily accomplished by simply flushing the resin bed first with pentane to flush out remaining polymer and then again treating the resin bed with dilute aqueous caustic and then dilute aqueous acrylic acid to regenerate the desired solid nucleophilic reagent bed containing surface benzyl tributyl ammonium acrylate functionality again for reuse with no loss of the resin functionality or difficult waste disposal problems.

During the regeneration step with dilute caustic, an aqueous waste stream containing dilute sodium bromide is generated. This stream can be concentrated by evaporation to produce a brine solution from which bromine can be regenerated for use in brominating more isobutylene/para-methylstyrene copolymer or the sodium bromine can simply be sold for other uses. The by-product of the regeneration step with aqueous acrylic acid is simply water so this stream can simply be fortified with fresh acrylic acid and recycled indefinitely.

The process is easily made continuous by switching back-and-forth between two parallel packed columns with alternatively one column always in production and the other in regeneration. It is also obvious to one skilled in the art that the resin can be treated with reagent other than acrylic acid to produce other surface nucleophilic reagents on the solid resin for use in converting the benzylic bromine functionality on polymers to other desired functionalities by appropriate nucleophilic substitution reactions. Our invention then is highly advantageous compared to prior art methods for producing these desired functional polymers.

SUMMARY OF THE INVENTION

According to one aspect, the invention is directed to a process for the conversion of a benzylic halogen functionality on a halogenated polymer to other functionalities, the improvement consisting of contacting the halogenated polymer with a solid nucleophilic reagent.

The reagent(s) comprises a solid nucleophile reagent containing oxygen, sulfur, nitrogen, phosphorous, carbon, silicon, magnesium, lithium, sodium, and potassium.

DETAILED DESCRIPTION OF THE PREFERRED EMBODIMENT OF THE INVENTION

The invention is directed to a solid nucleophilic reagent for the conversion of a benzylic halogen functionality on a polymer to other functionalities and the methods of making and utilizing the same.

The solids which may be utilized in the practice of the invention are polymeric materials, typically ion exchange resins such as lightly cross-linked porous polystyrenic anion exchange resins containing benzylic trialkyl ammonium functionality, benzyl trialkyl phosphorous functionality, etc. Preferably, the solid nucleophilic reagent comprises a porous resin. However, as understood by one skilled in the art, the particular solid utilized will depend upon the particular application.

The solid reagent of the present invention includes a nucleophilic reagent which is capable of converting the benzylic halogen functionality of a polymer to another functionality. In a preferred embodiment, the nucleophilic reagent includes, but is not limited to, regents having an element selected from the group consisting of oxygen, sulfur, nitrogen, phosphorous, carbon, silicon, magnesium, lithium, sodium, and potassium.

Specific nucleophiles for the conversion of benzylic bromine functionalities on polymers, like isobutylene/para-methylstyrene copolymers, to other functionalities are known and include: alkoxides, phenoxides, carboxylates, acrylates, thiolates, thiophenolates, thioesters, thiocarboxylates, dithiocarboxylates, thioureas, dithiocarbamates, xanthates, thiocyanates, silanes, halosilanes, cyanides, organo lithium (or other alkali or alkaline earth metals) compounds, malonates, di or trisubstituted methane derivatives, amides, amines, carbazoles, phthalimides, pyridine, maleimide, imino-compounds, phosphines, etc. Examples of other halogenated polymers that the can be subsequently functionalized using this invention include: styrene/vinyl/benzyl/chloride copolymers, chloromethylated polystyrenes, butadiene/styrene/chloromethylated styrene tripolymers, etc.

The nucleophilic substitution reaction utilizing the present invention takes place between a solid phase and a liquid phase. The solid phase contains a nucleophilic agent whereas the liquid phase contains a polymer having a good leaving group. Upon colliding, the nucleophilic agent from the solid is transported to the polymer and simultaneously the leaving group from the polymer is re-incorporated to the solid. Basically, the ion exchange proceeds through a $S_N2$ mechanism.

Solvents that are considered appropriate for the prevent invention include: THF, toluene, hydrocarbon (pentane, hexane, cycolohexane, heptane, etc.), benzene, carbon tetrachloride, and chloroform. The nucleophilic substitution reaction can be affected in a temperature range between ambient temperature and solvent reflux temperature. The molar ratio of the nucleophile agent on the solid to the leaving group on the polymer can range from 0.5:1 to 50:1.

The present invention, while not meant to be limited by, will be better understood by a review of the following example.

EXAMPLE

A solid nucleophilic reagent containing the appropriate nucleophilic ion for the subsequent polymer modification was prepared. Specifically, an acrylate esterification of a brominated co-isobutylene-p-methylstyrene polymer using a functionalized polystyrenic resin was prepared. The polystyrenic resin containing benzyl trialkylammonium chloride was packed in a column and treated with $H_2SO_4$ (4.5 mmoles per MEQ) to form a softer hydrogen sulfate anion. Immediately following this, the packed bed was treated with NaOH (18 mmoles per MEQ) and eventually with methacrylic acid (1.5 mmoles per MEQ) to yield the desired nucleophilic anion on the solid. All steps were carried out at room temperature.

The pre-treatment with $H_2SO_4$ to form a hydrogen sulfate ion on the solid improved the conversion efficiency of the acrylate ion. Without the pre-treatment step, merely 5% of the chloride ion was converted to acrylate group. However, with the $H_2SO_4$ pre-treatment, as high as 95% of the chloride ion could be converted to acrylate group. Once the solid was treated with methacrylic acid, it was dried in a vacuum oven at 50 C. The final form of solid with the benzyl trialkylammonium methacrylate functionality is reasonably stable at this temperature.

A 500-ml flask reactor equipped with a heating mantle and an air stirrer was assembled to conduct a nucleophilic substitution reaction between the treated solid and a brominated co-isobutylene-p-methylstyrene copolymer. The brominated polymer was prepared by a free radical reaction where the bromine atom was selectively attached to the benzylic carbon.

A 6% polymer solution in toluene (23 gm of polymer in 350 gm of toluene) was prepared in the reactor under continuous stirring with a nitrogen blanket at room temperature. The solution was then heated under stirring to 65 C and pre-weighed amount of dried polystyrenic solid (50 gm) was slowly added into the reactor. Following this, the reactor was heated up to 75 C and samples at pre-determined time intervals (1 hour) were taken for FTIR analysis. In this experiment, the excess amount of nucleophilic functionality to the bromide functionality was approximately 10 to 1 on a molar basis.

When stirring the treated solid with the polymer solution in a batch reactor, FTIR analysis on the polymer samples shows a diminishing peak of the benzylic bromine functionality and a rising peak of carbonyl functionality with respect to the reaction time. Therefore, the nucleophilic substitution reaction between the nucleophile on the solid and the leaving group on the polymer occurred.

We claim:

1. A process for the conversion of a benzylic halogen functionality on a polymer to other functionalities, the process comprising contacting the polymer with a chemically modified cationic resin.

2. The process of claim 1 wherein the resin is chemically modified with a solid nucleophilic reagent, the solid nucleophilic reagent comprising an element selected from the group consisting of oxygen, sulfur, nitrogen, phosphorous, carbon, silicon, magnesium, lithium, sodium, and potassium.

3. The process of claim 1 wherein the polymer comprises an isobutylene/para-methylstyrene copolymer.

4. The process of claim 1 wherein the halogen comprises bromine.

5. A process for the conversion of a benzylic halogen functionality on a polymer to other functionalities, the process comprising contacting the polymer with a solid cationic exchange resin containing nucleophilic reagents, the nucleophilic reagents having a cationic portion and an anionic portion, wherein the cationic portion of the reagent comprises an element selected from nitrogen or phosphorous and the anionic portion comprises an element selected from the group consisting of phenoxides, carboxylates, acrylates, thiolates, and dithiocarbamates.

6. A process for the conversion of a benzylic halogen functionality on a polymer to other functionalities, the process comprising providing a solid polystyrenic ion exchange resin, said resin functionalized with benzyl trialkylammonium acrylate or trialkylphosphonium acrylate, and contacting the benzylic halogen functionality of the polymer with the functionalized resin.

* * * * *